Figure 1:
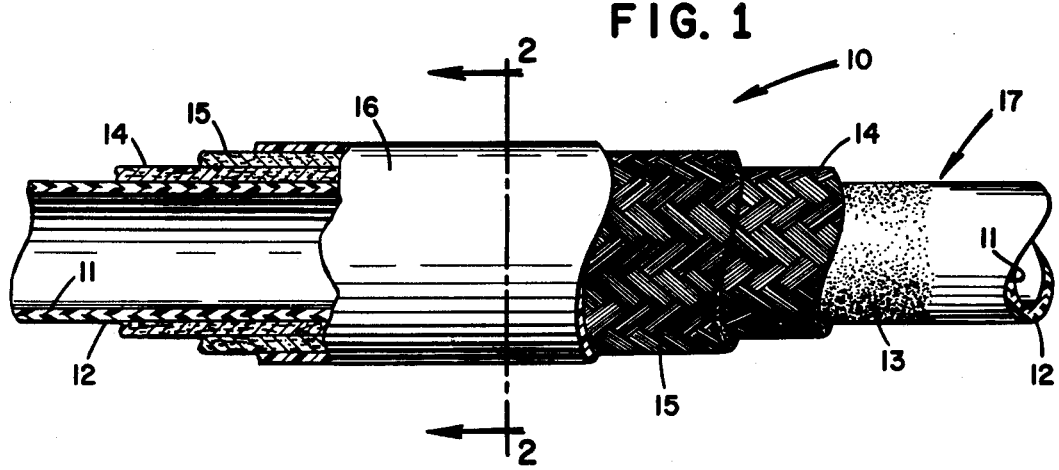

United States Patent [19]

Russell

[11] 4,196,464
[45] Apr. 1, 1980

[54] SEMI-CONDUCTIVE LAYER-CONTAINING REINFORCED PRESSURE HOSE AND METHOD OF MAKING SAME

[75] Inventor: David D. Russell, Ravenna, Ohio

[73] Assignee: Eaton Corporation, Cleveland, Ohio

[21] Appl. No.: 880,718

[22] Filed: Feb. 23, 1978

[51] Int. Cl.² .......................... B32B 1/08; B32B 1/10; F16L 11/12

[52] U.S. Cl. .................................. 361/215; 138/103; 138/109; 138/125; 138/130; 138/137; 138/140; 138/141; 138/177; 156/149; 156/172; 156/244.13; 174/47; 174/98; 174/102 SC; 174/102 C; 264/173; 264/176 R; 428/36

[58] Field of Search ............... 138/124, 125, 137, 140, 138/141, 177, 145, 146, 130, 103, 109; 264/173, 176 R; 174/102 SC, 102 C, 47, 98; 428/36; 156/149, 172, 244; 361/215

[56] References Cited

U.S. PATENT DOCUMENTS

| 3,042,737 | 7/1962 | Brumbach et al. | 174/47 |
|---|---|---|---|
| 3,166,688 | 1/1965 | Rowand et al. | 138/103 |
| 3,290,426 | 12/1966 | Barrentine | 138/103 |
| 3,405,398 | 9/1975 | Johansen et al. | 138/140 |
| 3,473,087 | 10/1969 | Slade et al. | 174/47 |
| 3,828,112 | 8/1974 | Johansen et al. | 156/172 |
| 3,845,186 | 10/1974 | Shaw | 174/47 |
| 3,963,856 | 6/1976 | Carlson et al. | 174/47 |
| 3,988,188 | 10/1976 | Johansen et al. | 156/195 |
| 4,059,847 | 11/1977 | Phillips et al. | 174/47 |

FOREIGN PATENT DOCUMENTS

| 2103394 | 4/1972 | Fed. Rep. of Germany | 138/103 |
|---|---|---|---|
| 45-32633 | 10/1970 | Japan | 174/47 |

Primary Examiner—James C. Cannon
Attorney, Agent, or Firm—R. J. McCloskey; A. Chrow

[57] ABSTRACT

A fibrous reinforced flexible hose for conveying fluids such as paint under pressure is provided with a composite core tube preferably simultaneously co-extruded from two or more synthetic polymers which are in intimate contact with each other. The inner layer of the composite core tube is nylon or other chemical resistant polymer which may or may not be cross-linked and the outer layer is a cross-linked electrically semi-conductive synthetic polymer layer which serves as a ground for static electricity. In the process of making the hose, the semi-conductive layer is preferably cross-linked by irradiation as a means of improving its higher temperature performance capabilities and to minimize changes in the electrical resistance of the semi-conductive layer that might arise from dynamic use of the hose.

30 Claims, 2 Drawing Figures

SEMI-CONDUCTIVE LAYER-CONTAINING REINFORCED PRESSURE HOSE AND METHOD OF MAKING SAME

This invention relates generally to composite tubing and more particularly to a hose for transmitting fluids under pressure in a spraying apparatus such as a paint spray. A portion of the subject matter of this application is related in part to our co-pending application Ser. No. 469,611 filed May 13, 1974 and Ser. No. 598,537 filed July 23, 1975, and now abandoned, and is an improvement over our application Ser. No. 620,189 filed Oct. 6, 1975.

Apparatus for spraying liquids such as paint is provided with a pump and hose assembly for transmitting liquid under pressure from a supply tank to a spray gun nozzle. An electrically conductive ground wire is usually included throughout the length of the hose to drain off any static electricity developed at the spray nozzle of the hose to prevent sparking when it approaches a conductor such as a steel beam or the like. A hose having a flexible polymeric core tube, fibrous reinforcing material wound about the core tube and a protective sheath is used to convey the liquid at a pressure which is sufficiently high to produce a spray. The hose must be capable of expanding radially under the pulsation of the pump in order to act as an accumulator which attentuates the pulses so as to minimize pulsating at the nozzle and thereby produce a relatively smooth and uniform spray of liquid. On electrical motor operated paint spray systems, the accumulator action also retards the rate of pressure change affecting the motor controlling pressure switch, thereby reducing the number of stops and starts of the motor controlling the fluid pump.

It has been proposed heretofore to wind a metallic ground wire about the core tube as one of the braids of the reinforcing layer. However, the wire frequently deteriorated under pressure and mechanical action and the abrasion of the braid by the wire sometimes resulted in bursting of the hose. Additionally, such deterioration of the ground wire resulted in large increases in its electrical resistance or interrupted its electrical continuity resulting in deminished or loss of ability of the hose to dissipate static electrical charge.

It is proposed in U.S. Pat. Nos. 3,445,583, 3,543,803 and 3,780,208 to provide improved hoses for transmitting liquids from a pulsating source with a metallic grounding wire helically wound about the core tube and enclosed within a rupture resistant sleeve. While the disclosed hoses have been found to be adapted for successfully transmitting paints under most conditions, the inclusion of a grounding wire enclosed in a plastic sleeve introduces additional steps in the manufacture of the hose and it has been found in practice that the ground wire still sometimes ruptures and the fragments are not always confined sufficiently to maintain continuity of the static discharge system. Also, the fragments may penetrate the core or sheath causing a premature failure of the hose.

It has also been proposed in U.S. Pat. No. 3,828,112 to provide a composite hose for the conveyance of paint having an electrical charge of generally more than 25 kilovolts. The disclosed hose requires a combination of metallic reinforcement; semi-conductive layer; and a highly insulative layer disposed between the semi-conductive layer and the electrically charged paint which is capable of substantially preventing leakage of static electricity therebetween. The referenced hose differs from that of the present invention in that it requires a highly electrically insulative layer to be disposed between the fluid being conveyed and the semi-conductive outer layer and further requires a metallic electrical conductor wound in electrical contact about the semi-conductive layer to drain off static electricity.

It is therefore an object of this invention to provide an improved flexible composite hose having a means incorporated therein for dissipating static electricity. Another object of the invention is to provide a flexible composite hose for use with a paint spraying apparatus or the like which is adapted for transmission of pulsating fluids and has a static discharge means which is conveniently incorporated in the hose and effectively discharges static electricity throughout the life of the hose. A further object of the invention is to provide a flexible composite hose with a grounding means coextensive with the length of the hose which is not ruptured or otherwise broken by the pulsating and/or mechanical action of the hose. A still further object of the invention is to provide an improved flexible reinforced pressure hose having a composite core tube having a semi-conductive material as its outer layer that is coextensive with the length of the hose and which has been cross-linked for improvement of its higher temperature performance capabilities and to minimize changes in the electrical resistance that might arise from dynamic use of the hose. Another object of the invention is to provide a method of making an improved flexible reinforced pressure hose having a composite core tube having a semi-conductive material as its outer layer that is coextensive with the length of the hose and which has been cross-linked for improvement of its higher temperature performance capabilities and to minimize changes in the electrical resistance that might arise from dynamic use of the hose.

Figure 2:
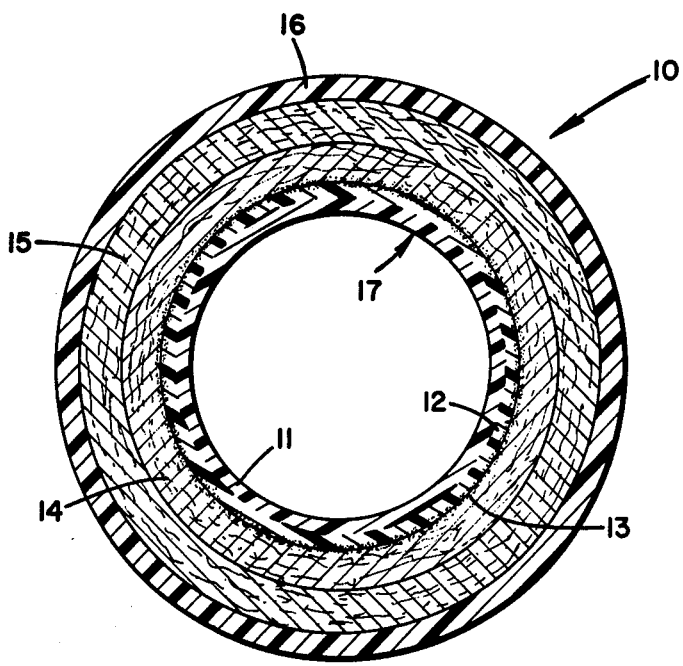

Other objects will become apparent from the following description with reference to the accompanying drawing wherein FIG. 1 is a cut-away side elevation, partially in section, of one embodiment of the invention; and FIG. 2 is a cross-section taken along the line 2—2 of FIG. 1.

The foregoing objects and others are accomplished in accordance with this invention, generally speaking, by providing a composite reinforced hose having a core tube shaped from two layers of synthetic resinous material which are in intimate contact with each other with the outer layer of the tube wall being a semi-conductive cross-linked material, one or more layers of a fibrous reinforcing material disposed about the core tube and a protective synthetic resinous sheath disposed about the fibrous reinforcing material. The composite core tube has an inner layer made from a material (which may or may not be cross-linkable) adapted to resist chemical attack by the fluid conveyed by the hose and to provide electrical connection between the fluid contained within the core tube and an outer semi-conductive layer disposed about and coextensive with the outer surface of the inner layer. The coextensive cross-linked semi-conductive outer layer of the core tube serves as a means for conducting static electricity generated on the inner surface of the core tube inner layer by flow of the fluid along the length of the hose to a suitable ground. The semi-conductive outer layer of the core tube also serves as a means for conducting static electricity generated at the spray nozzle head as a result of increased flow of the fluid and to conduct it axially along the length of the hose to ground. The invention thus provides a flexible hose, particularly suitable for use in the conveyance of paint, fuels, solvents, and the like, having a synthetic resinous core tube, a fibrous reinforcing layer about the core tube, a protective sheath about the fibrous reinforcement layer and a grounding means forming a part of the wall of the core tube. Although the composite core tube may be formed by covering the inner layer with a non-metallic semi-conductive tape or by spraying the inner layer with a conductive coating or by dipping the inner layer in a conductive resin, the core tube is preferably formed by coaxially extruding two different extrudable synthetic polymers to provide a flexible tube having a wall of two synthetic resinous layers. The two layers may be extruded in two separate extrusion steps or they may be simultaneously coextruded so that the layers are melt fused together. The conductive layer extends throughout the entire length of the hose and is in electrical contact with the fluid being conveyed through the hose and with a grounded hose fitting connected to the hose. The grounding layer is a synthetic polymer which is semi-conductive, i.e., it exhibits a volume resistivity of $10^9$ ohm-cm or less.

In airless paint spraying processes, it is undesirable to accumulate more than 1400 static volts at the spray head of the spraying apparatus because of the danger of igniting the air-solvent mixture about the spray gun. Preferably a safety factor of 4:1 should be maintained which means that the static voltage on the spray end of the hose should not exceed 350 volts. The hose provided by this invention has a ground which is a crosslinked semi-conductive layer of polymer which will drain off the static potential so a frightening or dangerous electrical-arc between the spray gun and ground is avoided.

Any suitable conductive synthetic polymer which can be cross-linked after processing may be used. Preferably, the semi-conductive synthetic polymer is one which will melt fuse to the polymer of the first layer when the two polymers are coaxially extruded. The conductive polymer must have the required electrical properties. While a semi-conductive polymer having a volume resistivity after application and other processing of as high as 100,000 ohm-cm at ambient temperature may be used, usually the volume resistivity will not be more than about 2000 ohm-cm. It is preferred to use one having a calculated volume resistivity of not more than about 500 ohm-cm. In fact, best results have been obtained so far with a polymer having a volume resistivity of 40 or less ohm-cm. The volume resistivity may be calculated by the method described in "NFPA Journal No. 77, Static Electricity, 1972". Examples of suitable polymers are ethylene-ethyl acrylate, ethylene-vinyl acrylate and thermoplastic rubber having the desired volume resistivity but it is preferred to use a polyurethane of the desired volume resistivity in hoses having a nylon inner layer where kink resistance is desirable because the polyurethane bonds well to the nylon and can be bonded to the reinforcing material.

The semi-conductive polymer may have carbon particles, graphite particles, silver particles, copper particles or mixtures thereof or other suitable electrically conductive particles dispersed substantially uniformly therein to provide the polymer with a volume resistivity within the requirements of the hose.

The invention permits the manufacture of a composite reinforced semi-conductive hose particularly suitable for use in conveying paint having some particularly desirable physical property without substantial compromise of other desirable properties combined with a means for effectively draining static electricity from the hose. For example, a substantially chemically resistant polymer such as nylon may be chosen for the inside layer of the core tube wall and a layer of a more flexible polymer such as an elastomeric polyurethane composition having electrically conductive particles dispersed therein and which will cross-link by exposure to radiation may be fused thereto as the outer layer to provide improved flexibility, kink resistance and means for preventing sparking of static electricity at the nozzle of the hose. It has been found that cross-linking of the conductive outer layer of the composite core tube increases by 25 degrees Fahrenheit or more the temperature at which hose embodiments of the invention can be used and that changes in the electrical resistivity resulting from pressure pulsation and flexing during dynamic use of the hose appear to be minimized as a result of crosslinking the outer semi-conductive layer of the composite core tube.

The core tube may be fabricated by any suitable simultaneous coaxial extrusion process which will produce melt fusion of two different layers of synthetic resins together to the extent that the two layers will not separate at the interface under elongation and other conditions to which the hose will be exposed. The most practical method of making the core tube is to supply two different types of the same resin to a single extrusion head from different extruders operating under conditions whereby the resin which will be the inner portion of the core tube is still molten when the molten resin for the other portion of the core tube wall is applied thereover and the two molten synthetic resins are extruded through the same extrusion die.

It has been found that two layers of selected synthetic resin with one being electrically conductive will melt fuse together along the interface and became so firmly bonded together that the core tube will not delaminate in a hose used to convey fluids under high pressure even if the physical properties of the two layers are significantly different. For example, nylon and semi-conductive thermoplastic polyurethane composition having particles of carbon black uniformly dispersed therein and which will cross-link by exposure to radiation will melt fuse together in accordance with the process of the invention. Hence, the invention contemplates a semi-conductive hose particularly useful for conveying paint having a core tube with a layer of nylon melt fused to a layer thermoplastic substantially non-porous polyurethane composition which is subsequently cross-linked by radiation. Usually, the nylon layer will be the innermost layer because of its chemical resistance and its ability to permit electrical interconnection between the fluid being conveyed through the hose and the semi-conductive outer layer disposed about the outer surface of the core tube inner layer.

The invention also provides composite reinforced hoses having a core tube of two or more layers of synthetic resin of the same general chemical composition but modified to provide different physical properties. For example, a relatively hard thermoplastic polyurethane having a hardness of Shore D 50 to 60 and a relatively soft thermoplastic polyurethane having a hardness of Shore A 80 to 95 may be coextruded to form a core tube. The harder thermoplastic polyurethane has better chemical resistance than the softer one so the harder one is usually the inner layer of the core tube while the softer one contains particles of an electrical conductor and is the outer layer. The presence of the layer of softer polyurethane improves the flexibility of the hose as well as providing a semi-conductor for static electricity.

Other combinations of synthetic resins which may be coaxially extruded simutaneously or in tandem to form a core tube having two or more layers are those disclosed in our application Ser. No. 598,537. For example, segmented co-polyesters such as "Hytrel" as one layer and a polyvinyl chloride compound for the conductive layer. A segmented co-polyester may be used for one layer and a conductive substantially non-porous thermoplastic polyurethane as the other layer. A mechanical mixture of an aromatic polyester such as poly(tetramethylene terephthalate) and a segmented co-polyester may be used as one layer and a conductive polyvinyl chloride polymer as the outer layer. The laminated core tubes combining a layer of "Hytrel" or a mixture of a segmented co-polyester and an aromatic polyester and a layer of polyvinyl chloride compound or polyurethane will usually have the layer containing the segmented co-polyester on the inside as the non-conductive layer. A mechanical mixture of segmented co-polyester and polyurethane may also be used for one of the layers, usually the outer layer. The inner layer of the core tube may be a mixture containing from about 5 to about 95% by weight polyurethane and 95 to 5% by weight aromatic polyester in combination with any of the outer layers disclosed herein. The inner layer may also be a mixture of polyacetal and polyurethane in combination with any of the outer layers. In these embodiments, as with all embodiments of the invention, the outer layer contains particles which are electrically conductive and the inner layer is such that it provides suitable chemical resistance in combination with an ability to permit the flow of static electricity (originating from static potentials generated on the inner surface of the inner layer as a result of fluid flow therethrough) radially outwardly to the outer semi-conductive layer and thence axially along the length of hose through the semi-conductive outer layer to ground.

Examples of suitable thermoplastic aromatic polyesters are "Valox", aromatic polyester sold by the General Electric Co., "Tenite", aromatic polyester sold by Eastman Kodak Co. and "Celanex", aromatic polyester sold by Celenese Plastics Co.

Any suitable relative proportions of aromatic polyester such as "Valox" and segmented co-polyester such as "Hytrel" may be used in the mixtures thereof extruded to form a layer of the core tube. For example, from about 5% to about 60% by weight aromatic polyester such as "Valox" and 95% to about 40% by weight segmented co-polyester such as "Hytrel" may be used. Any suitable mixture of polyurethane and co-segmented polyester may be used, but it is preferred to use from about 99% to about 50% thermoplastic polyurethane and 1% to about 50% by weight co-segmented polyester.

Although it is preferred that hoses made in accordance with the invention utilize a composite core tube having an extruded inner nylon layer whose outer surface is melt-fused to the inner surface of an extruded outer layer of polyurethane that is subsequently cross-linked, it is to be understood that the inner layer may be made from any synthetic polymer which: (1) can be extruded into a tubular shape; (2) provides a temperature and chemical resistance required; (3) is not electrically insulative to the extent that it prevents flow of static electricity between its inner and outer surface and; (4) which may or may not be cross-linked in the process of making the hose.

The core tube, if desired, may be adhesively bonded to the surface of the reinforcing material by any suitable means. Dependent upon the degree of cross-linking, hereinafter described, the reinforcing material may be bonded to the core tube by activating the outer surface of the semi-conductive layer with a solvating or softening agent to form an adhesive in situ from the resin on the outer surface of the irradiated semi-conductive layer. For example, a polyurethane surface of a core tube may (dependent upon the degree of cross-linking) be activated by wetting it with a suitable polar solvent such as, for example, N-methyl pyrrolidone or the like. However, it is preferred to apply an adhesive material such as a hot melt or solvated type such as a solution of polyurethane between the outer surface of outer semi-conductive layer and adjacent layer of fibrous reinforcing material because of the cross-linking effect of radiation and because the use of a solvating agent to solvate the outer surface of the semi-conductive layer may disturb the uniformity of the distribution of electrically conductive particles and affect the electrical conductivity of the semi-conductive polymer layer. The adhesive may itself be of a type that can be cross-linked as part of the process of making an embodiment of the hose of the invention and as such contribute to its higher temperature resistance capabilities.

It has been found that simultaneously coextruded properly selected synthetic thermoplastic polymers will become bonded together by melt fusion even though one of the polymers contains particles of electrically conductive material and that an intermediate adhesive is not necessary. For example, nylon will fuse to a radiation cross-linkable thermoplastic elastomeric polyurethane composition containing carbon black particles if the two molten synthetic polymers are fed separately to an extrusion head and coextruded one over the other while still molten. In those instances where one layer of the core tube is difficult to melt fuse to another layer, an intermediate layer of a third synthetic resin which will melt fuse to both layers and which will not interfere with the hereinbefore described flow of static electricity may be interposed therebetween but it is preferred to melt fuse the semi-conductive layer directly to the inner layer of the core tube.

Referring now to the drawing, a semi-conductive pressure hose 10 having a core tube I.D. of 0.25 inch is illustrated in FIGS. 1 and 2. Hose 10 has a core tube 17 formed by the simultaneous coaxial extrusion of layer 11 of Nylon about 0.025 inch thick and an irradiation cross-linked semi-conductive thermoplastic elastomeric polyurethane composition outer layer 12 about 0.015 inch thick and containing carbon particles and having a volume resistivity at room temperature (about 20° C.) of about 20 ohm-cm. The two synthetic resins become fused together at the interface to form a core tube 17 which will not delaminate when the hose 10 is used for conveying a point under pulsating pressure. The outer surface of polyurethane of core tube 17 is wet with an adhesive solution 13 of a solvated polyurethane. A reinforcing layer 14 of nylon filaments is braided under tension around the core tube while the adhesive on the surface of core tube 17 is wet. The filaments become bonded to the surface of the core tube 17 forming an elastomeric bond of the fibrous reinforcing material with the core tube. A second reinforcing layer 15 of poly(ethylene terephthalate) ester is braided over layer 14. A protective polyurethane sheath 16 about 0.025 inch thick is extruded over fibrous reinforcing layer 15 by extrusion of a thermoplastic elastomeric polyurethane thereover. Sheath 16 may be adhesively bonded to the surface of layer 15.

Any other core tube similar to those disclosed as suitable herein may be substituted in the foregoing embodiment of the invention for core tube 17 and the core tube 17 may or may not be bonded to the reinforcing layer and successive reinforcing layers may or may not be bonded together depending upon the particular requirements of the hose.

The polyurethane layer 12 of core tube 17 may be extruded from any suitable thermoplastic polyurethane such as the one sold under the trademark "Pellethane" by the Upjohn Company or of the type disclosed and claimed in U.S. Pat. No. 4,010,146 assigned to the assignee of the present invention. The polyurethane disclosed in U.S. Pat. Nos. 3,116,760 and 3,722,550 and disclosed in the book by Saunders and Frisch, entitled "Polyurethanes: Chemistry and Technology", published by Interscience Publishers, copyright 1964 may also be used. Reaction products of poly(tetramethylene ether)glycol, suitable chain extender such as 4,4'-diphenylmethane diisocyanate and polyurethane prepared by reacting an inner ester such as poly(e-caprolactone)ester and a suitable chain extender such as 1,4 butane diol with an aromatic diisocyanate such as 4,4'-diphenylmethane diisocyanate are preferred. The sheath 16 may also be extruded from any other suitable synthetic resin such as, for example, nylon in some embodiments of the invention.

In accordance with the present invention, synthetic polymers found suitable for use as the outer layer of the composite core tube are compounded to include sufficient amounts of electrically conductive particles and cross-linking agents and may or may not include additional additives such as, for example, heat stabilizers, processing oils, stabilizers, fillers and the like. Although the cross-linking agents may be of the heat activating type such as used in a vulcanization process, it is preferred to use radiation sensitizers in the compositions so that the semi-conductive outer layer of the composite core tube can be cross-linked by irradiation during the process of making the hose rather than use vulcanization as the means of cross-linking. Although it is preferred to extrude the inner layer of the composite core tube from a thermoplastic polymer that is not cross-linkable the polymer of the inner layer may also include cross-linking agents and other additives as long as such agents and additives do not interfere with the hereinbefore described characteristics required of the inner layer. If, for certain embodiments of the hose of the invention, it is determined that the inner layer should be cross-linked, it is preferred to incorporate a suitable amount of a radiation sensitizer into both the inner layer and the outer semi-conductive layer so that both can be cross-linked by exposure to radiation during the process of making the hose.

The presently preferred method of cross-linking the semi-conductive outer layer of the composite core tube is similar to the method of making a flexible dimensionally stable, hydraulic hose disclosed in our U.S. Pat. No. 3,988,188. In the present invention, the composite core tube is exposed to radiation preferably in the form of high energy electrons and the synthetic polymer of the outer layer contains sufficient radiation sensitizer to effectively cross-link both the inner and outer layers of the composite core tube during exposure to high energy electron radiation. Any suitable source of high energy electrons, such as an insulating core transformer, a resonant transformer or linear accelerator may be used to provide the high energy electrons. Preferably, the energy of the electrons should be at least 100,000 electron volts and seldom will more than 15 million electron volts be required. It is preferred that the required dosage to effectively cross-link either the outer layer or both inner and outer layers of the composite core tube be effected in one exposure, but repeated exposures can be made until the entire total dosage has been obtained. Although it is preferred to irradiate the composite core tube prior to the placement of one or more layers of reinforcement and outer protective sheath thereabout, the composite core tube may be irradiated after it has been reinforced or protective sheath has been placed thereabout.

Although the protective sheath may be made from any suitable flexible material resistant to conductance of electrical current, it is preferred that the sheath be made from a polymeric material which provides suitable flexibility in combination with suitable resistance to electrical conductance, abrasion, chemicals, cut through and temperature. Although the protective sheath may be made from a synthetic polymeric material such as, for example, nylon, thermoplastic rubber, rubber, thermoplastic polyester, polyvinyl chloride, and the like, it is preferred to make the outer protective sheath from a polyurethane such as hereinbefore described. The outer protective sheath may or may not be cross-linked. In cases where it is desired to cross-link by exposure to high energy electron radiation in the manner hereinbefore described.

The fibrous reinforcing material may be formed by braiding filaments or by helically winding strands of filaments of any suitable synthetic resinous material, such as, for example, a poly(alkylene terephthalate)ester, nylon, aromatic polyamide or the like or combinations thereof. Suitable nylon fibrous reinforcing material is disclosed in U.S. Pat. No. 3,334,164 while suitable poly(alkylene terephthalate)ester fibrous reinforcing material is disclosed in U.S. Pat. No. 3,062,241. Such fibers have a tenacity of about 7 to about 11 grams per denier and an elongation at break of about 9% to about 17%. In one embodiment of the invention, the hose may be provided with a reinforcing layer of braided of helically wound filaments having a tenacity of at least 13 grams per denier and up to about 25 grams per denier and an elongation at break of from about 2% to about 7% such as the aromatic polyamide fiber marketed by E. I. dePont de Nemours & Co. under the trademark "Kevlar". Suitable reinforcing material containing synthetic aromatic polyamide filaments is disclosed in U.S. Pat. No. 3,905,398, issued on Sept. 16, 1975. A fibrous reinforcing material of aromatic polyamide fibers may be used to advantage in composite hoses having a high burst strength.

The composite core tube can be shaped by extrusion with any suitable extrusion apparatus having a separate extruder for feeding each synthetic thermoplastic resin to a single extrusion head.

Although the invention has been described in detail for the purpose of illustration, it is to be understood that such detail is solely for that purpose and that variations can be made therein by those skilled in the art without departing from the spirit and scope of the invention.

What is claimed is:

1. A flexible hose for conveying and spraying a fluid which comprises
    a core tube through which the fluid flows under pressure, said core tube having a laminated wall with a first extruded lamina of a synthetic polymer adjacent to the fluid which resists chemical attack by the fluid and which conducts static electricity radially outwardly from the fluid and a second lamina disposed radially outwardly about the first lamina, said second lamina being a semi-conductive polymer which is in electrical contact with the first lamina, said semi-conductive polymer being a cross-linked polymer, said laminae being co-extensive throughout the length of the hose,
    at least one layer of fibrous material disposed about the core tube and reinforcing it against bursting under pressure from the fluid,
    a substantially non-electrical conducting synthetic polymer sheath about the said fibrous material, and
    a spray nozzle on one end of the hose in electrical conducting contact with said semi-conductive lamina and electrically connected to ground.

2. The flexible hose of claim 1 wherein the outer semi-conductive layer is an extruded layer.

3. The flexible hose of claim 1 wherein the extruded inner layer and semi-conductive outer layer are melt fused to provide the intimate contact therebetween.

4. The flexible hose of claim 1 wherein the synthetic polymeric material of the extruded inner layer is a nylon and the cross-linked semi-conductive outer layer material is a polyurethane.

5. The flexible hose of claim 1 wherein the semi-conductive outer layer polymeric material contains carbon particles.

6. The flexible hose of claim 1 wherein the outer layer of cross-linked semi-conductive polymeric material has an electrical volume resistivity at 20° C. of not more than about 2000 ohm-cm.

7. The flexible hose of claim 1 wherein the polymeric material of the inner layer is a nylon and the outer semi-conductive layer is an extruded layer of a polyurethane composition containing carbon particles.

8. The flexible hose of claim 1 wherein the fibrous reinforcement is bonded to the outer semi-conductive polymeric layer.

9. The flexible hose of claim 1 having more than one layer of fibrous reinforcement and the adjacent layers thereof are bonded together.

10. The flexible hose of claim 1 wherein the polymeric material is an extruded polyurethane.

11. The flexible hose of claim 1 wherein the polymeric material of the sheath is a cross-linked polymeric material.

12. The flexible hose of claim 1 wherein the cross-linked polymeric material of the semi-conductive outer layer is a radiation cross-linked material.

13. The flexible hose of claim 12 wherein the radiation cross-linked semi-conductive layer is a high energy electron radiation cross-linked material.

14. The flexible hose of claim 1 wherein the polymeric material of the sheath is an irradiation cross-linked material.

15. The flexible hose of claim 14 wherein the radiation cross-linked polymeric material of the sheath is a high energy electron radiation cross-linked material.

16. The flexible hose of claim 1 wherein the polymeric material of the inner layer is a cross-linked material.

17. The flexible hose of claim 16 wherein the cross-linked polymeric material of the inner layer is a radiation cross-linked material.

18. The flexible hose of claim 17 wherein the cross-linked polymeric material of the inner layer is a high energy electron cross-linked material.

19. In a method of making a flexible reinforced hose for conveying fluids under pressure comprising a composite core tube, one or more layers of fibrous reinforcing material disposed about the core tube and a substantially electrically non-conductive polymeric protective sheath disposed about the reinforcement material, said core tube having a laminated wall with a first extruded lamina of a synthetic polymer adjacent to the fluid which resists chemical attack by the fluid and which conducts static electricity radially outwardly from the fluid and a second lamina disposed radially outwardly about the first lamina, said second lamina being a semi-conductive polymer which is in electrical contact with the first lamina, said semi-conductive polymer being a cross-linked polymer, said laminae being co-extensive throughout the length of the hose, the method including the steps of:
    (a) Extruding an inner layer of a suitable flexible synthetic polymeric material into an elongate tubular shaped form;
    (b) Forming an outer tubular shaped layer of cross-linkable semi-conductive synthetic polymeric material coextensively about and in intimate contact with the inner layer;
    (c) Exposing the outer semi-conductive layer to an amount of radiation sufficient to cross-link the material;
    (d) Disposing one or more layers of fibrous reinforcement about the outer semi-conductive layer; and
    (e) Forming a protective sheath about the fibrous reinforcement material.

20. The method of claim 19 wherein the cross-linkable semi-conductive outer layer is formed by extrusion.

21. The method of claim 19 wherein the intimate contact is provided by melt fusing the outer semi-conductive layer to the inner synthetic polymeric layer.

22. The method of claim 19 wherein the radiation is provided by high energy electrons.

23. The method of claim 19 wherein the outer protective sheath is formed by extrusion.

24. The method of claim 19 wherein the semi-conductive outer layer is exposed to radiation after the fibrous reinforcement has been disposed thereabout.

25. The method of claim 19 wherein the semi-conductive outer layer is exposed to radiation after the outer protective sheath has been formed about the fibrous reinforcement.

26. The method of claim 19 wherein the polymeric material of the inner layer is a nylon.

27. The method of claim 19 wherein the semi-conductive material of the outer layer is a polyurethane.

28. The method of claim 19 wherein the outer layer of semi-conductive material has an electrical volume resistivity at 20° C. of not more than about 2000 ohm-cm.

29. The method of claim 19 wherein the outer layer of semi-conductive material contains carbon particles.

30. The method of claim 19 wherein the fibrous reinforcement is bonded to the semi-conductive outer layer during the process of making the hose.

* * * * *